(12) United States Patent
Xiao et al.

(10) Patent No.: US 7,570,916 B2
(45) Date of Patent: Aug. 4, 2009

(54) METHOD AND APPARATUS FOR PROVIDING AND OBTAINING BROADCAST MULTICAST SERVICE FEEDBACK

(75) Inventors: Weimin Xiao, Hoffman Estates, IL (US); Amitava Ghosh, Buffalo Grove, IL (US); Rapeepat Ratasuk, Hoffman Estates, IL (US)

(73) Assignee: Motorola, Inc., Schaumburg, IL (US)

( * ) Notice: Subject to any disclaimer, the term of this patent is extended or adjusted under 35 U.S.C. 154(b) by 230 days.

(21) Appl. No.: 11/466,231

(22) Filed: Aug. 22, 2006

(65) Prior Publication Data

US 2008/0049749 A1 Feb. 28, 2008

(51) Int. Cl.
    H04B 7/14 (2006.01)
(52) U.S. Cl. ............. 455/24; 455/454; 455/452.1; 455/69
(58) Field of Classification Search ........... 455/24, 455/552.1, 450, 464, 515, 509, 69, 454; 370/390, 370/328, 432, 352, 331, 329, 464
See application file for complete search history.

(56) References Cited

U.S. PATENT DOCUMENTS

2004/0184471 A1 9/2004 Chuah et al.
2004/0213214 A1* 10/2004 Jung et al. ............... 370/352
2005/0129058 A1* 6/2005 Casaccia et al. .......... 370/464
2005/0185620 A1 8/2005 Lee et al.
2006/0251015 A1* 11/2006 Khan ....................... 370/329

FOREIGN PATENT DOCUMENTS

| EP | 1519598 A1 | 3/2005 |
|---|---|---|
| EP | 1641302 A1 | 3/2006 |
| WO | 2004042963 A1 | 5/2004 |
| WO | 2005051032 A1 | 6/2005 |

* cited by examiner

Primary Examiner—Tan Trinh (57) ABSTRACT

Embodiments of the present invention provide a manner in which feedback from remote units (120-122) involved in a broadcast/multicast service session can be obtained using shared wireless resources and/or shared signaling sequences. Having feedback information from at least some of the remote units involved in the session enables the network equipment (101) to dynamically manage the session and potentially improve the performance of the session. Moreover, utilizing shared wireless resources and/or shared signaling sequences may reduce the overhead cost of obtaining the feedback as compared to utilizing dedicated resources.

18 Claims, 6 Drawing Sheets

METHOD AND APPARATUS FOR PROVIDING AND OBTAINING BROADCAST MULTICAST SERVICE FEEDBACK

FIELD OF THE INVENTION

The present invention relates generally to communications and, in particular, to providing and obtaining feedback for a broadcast/multicast service.

BACKGROUND OF THE INVENTION

Various communications protocols are known in the art. For example, the Third Generation Partnership Project (3GPP) and the Third Generation Partnership Project 2 (3GPP2) has been working towards developing a number of protocols for use with a wireless communication path. At present, 3GPP/3GPP2 work is progressing on evolution technologies. Two examples in 3GPP include Evolved Universal Terrestrial Radio Access (E-UTRA) and Evolved Multimedia Broadcast/Multicast Service (E-MBMS).

Currently, OFDMA/DFT S-OFDM (Orthogonal Frequency Division Multiple Access/Discrete Fourier Transform Spread Orthogonal Frequency Division Multiplexing) is a strong candidate for 3GPP/3GPP2 Evolution DL/UL (downlink/uplink) technologies. Utilizing OFDM throughout a system enables the use of a configuration like Single Frequency Network (SFN), which can provide high cell edge coverage for E-MBMS with a spectral efficiency greater than one. With multi-site macro-diversity, E-MBMS throughput can be 6-8 times that of Rel-6 MBMS. However, in a hotspot or in a cellular system without multi-site macro-diversity, E-MBMS throughput may only be comparable to that of Rel-6 MBMS. In addition, the optimal data rate can vary as a function of system load/configuration and remote unit distribution.

Accordingly, it would be desirable to have a method and apparatus that was able to provide improved E-MBMS performance, particularly for sessions that include users without multi-site macro-diversity.

Specific embodiments of the present invention are disclosed below with reference to FIGS. 1-6. Both the description and the illustrations have been drafted with the intent to enhance understanding. For example, the dimensions of some of the figure elements may be exaggerated relative to other elements, and well-known elements that are beneficial or even necessary to a commercially successful implementation may not be depicted so that a less obstructed and a more clear presentation of embodiments may be achieved. In addition, unless specifically indicated, the order and grouping of signaling is not a limitation of other embodiments that may lie within the scope of the claims.

Simplicity and clarity in both illustration and description are sought to effectively enable a person of skill in the art to make, use, and best practice the present invention in view of what is already known in the art. One of skill in the art will appreciate that various modifications and changes may be made to the specific embodiments described below without departing from the spirit and scope of the present invention. Thus, the specification and drawings are to be regarded as illustrative and exemplary rather than restrictive or all-encompassing, and all such modifications to the specific embodiments described below are intended to be included within the scope of the present invention.

DETAILED DESCRIPTION OF EMBODIMENTS

Embodiments of the present invention provide a manner in which feedback from remote units involved in a broadcast/multicast service session can be obtained using shared wireless resources and/or shared signaling sequences. Having feedback information from at least some of the remote units involved in the session enables the network equipment to dynamically manage the session and potentially improve the performance of the session. Moreover, utilizing shared wireless resources and/or shared signaling sequences reduces the overhead cost of obtaining the feedback as compared to utilizing dedicated resources.

Figure 1:
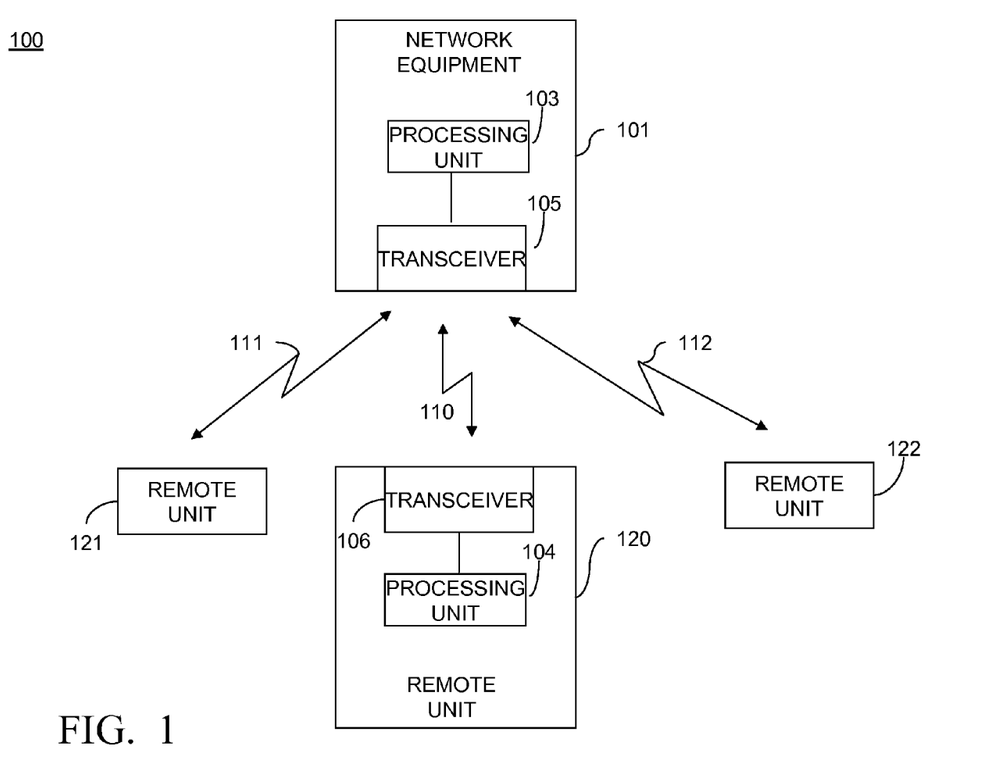
FIG. 1 is a block diagram depiction of a wireless communication system in accordance with a first group of embodiments of the present invention.
Figure 2:
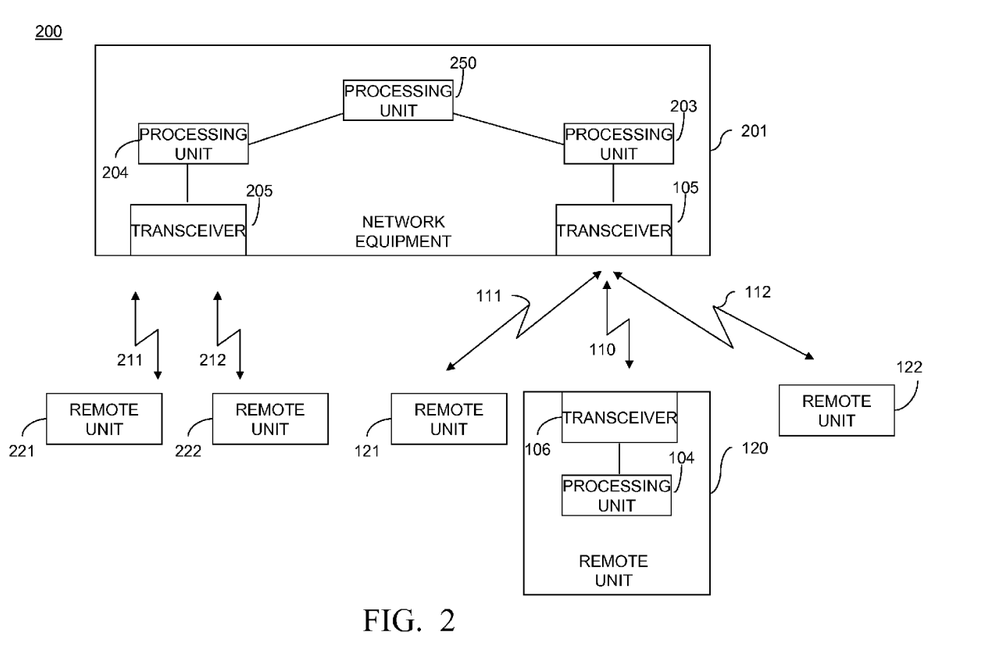
FIG. 2 is a block diagram depiction of a wireless communication system in accordance with a second group of embodiments of the present invention.

The disclosed embodiments can be more fully understood with reference to FIGS. 1-6. FIGS. 1 and 2 are block diagram depictions of wireless communication systems 100 and 200 respectively, in accordance with multiple embodiments of the present invention. At present, standards bodies such as OMA (Open Mobile Alliance), 3GPP (3rd Generation Partnership Project), 3GPP2 (3rd Generation Partnership Project 2) and IEEE (Institute of Electrical and Electronics Engineers) 802 are developing standards specifications for wireless telecommunications systems. (These groups may be contacted via http://www.openmobilealliance.com, http://www.3gpp.org/, http://www.3gpp2.com/ and http://www.ieee802.org/, respectively.) Communication systems 100 and 200 represent systems having architectures in accordance with one or more of the 3GPP technologies (such as the emerging E-UTRA and E-MBMS technologies), suitably modified to implement the present invention. Alternative embodiments of the present invention may be implemented in communication systems that employ other or additional technologies such as, but not limited to, those described in the 3GPP2 specification and/or those described in the IEEE's 802.xx specifications.

Communication systems 100 and 200 are depicted in a very generalized manner. In particular, in communication system 100, communication devices 101 and 120-122 are shown communicating via wireless interfaces 110-112. Depending on the embodiment, device 101 may represent a portion of a radio access network (RAN), such as a Node B, while device 120 may represent a UE (user equipment) device. Those skilled in the art will recognize that FIG. 1 does not depict all of the physical fixed network components that may be necessary for system 100 to operate but only those system components and logical entities particularly relevant to the description of embodiments herein.

For example, FIG. 1 depicts device 101 as comprising processing unit 103 and transceiver 105 and depicts device 120 as comprising processing unit 104 and transceiver 106. In general, components such as processing units and transceivers are well-known. For example, processing units are known to comprise basic components such as, but neither limited to nor necessarily requiring, microprocessors, microcontrollers, memory devices, application-specific integrated circuits (ASICs), and/or logic circuitry. Such components are typically adapted to implement algorithms and/or protocols that have been expressed using high-level design languages or descriptions, expressed using computer instructions, expressed using signaling flow diagrams, and/or expressed using logic flow diagrams.

Thus, given a high-level description, an algorithm, a logic flow, a messaging/signaling flow, and/or a protocol specification, those skilled in the art are aware of the many design and development techniques available to implement a processing unit that performs the given logic. Therefore, devices 101 and 120 represent known devices that have been adapted, in accordance with the description herein, to implement multiple embodiments of the present invention. Furthermore, those skilled in the art will recognize that aspects of the present invention may be implemented in and across various physical components and none are necessarily limited to single platform implementations. For example, device 101 may be implemented in or across one or more RAN components, such as a Node B/base transceiver station (BTS) and/or a radio network controller (RNC)/base station controller (BSC). Also, regarding remote units, remote unit platforms are known to refer to a wide variety of consumer electronic platforms such as, but not limited to, user equipment (UEs), access terminals (ATs), mobile stations (MSs), terminal equipment, mobile devices, gaming devices, personal computers, personal digital assistants (PDAs), cable set-top boxes and satellite set-top boxes.

In addition, those skilled in the art will recognize that wireless interfaces 110-112 of FIG. 1 do not necessarily depict all of the signaling that may be necessary for system 100 to fully operate. For example, depending on the embodiment, the wireless interface between devices 101 and 120-122 may comprise both uplink and downlink signaling and, more specifically, may comprise traffic channels, which are dynamically assigned and de-assigned to support user services, and a variety of well-known non-traffic channel types, such as broadcast channels, paging channels, access channels and/or common control channels, all in accordance with the particular 3GPP signaling technology used.

While FIG. 1 is intended to depict a first group of embodiments, FIG. 2 is intended to depict a second group of embodiments. In addition to remote units 120-122, FIG. 2 depicts remote units 221 and 222, which communicate with network equipment 201 via wireless interfaces 211 and 212 and transceiver 205. FIG. 2 also depicts processing units 203 and 204 in communication with processing unit 250. Depending on the embodiment, network equipment 201 may represent a portion of a radio access network (RAN), such as a couple of Node Bs (components 105, 203 and components 205, 204), while processing unit 250 may represent a portion of a server in communication with processing units 203 and 204 via a packet network. For example, processing unit 250 may represent a portion of a multicast/broadcast server such as an E-MBMS server.

Those skilled in the art will recognize that FIG. 2 does not depict all of the physical fixed network components that may be necessary for system 200 to operate but only those system components and logical entities particularly relevant to the description of embodiments herein. As described above with respect to FIG. 1, components such as processing units and transceivers are generally well-known. Therefore, the components of network equipment 201 represent known devices that have been adapted, in accordance with the description herein, to implement multiple embodiments of the present invention. Furthermore, those skilled in the art will recognize that aspects of the present invention may be implemented in and across various physical components that may not be co-located and none are necessarily limited to single platform implementations. For example, processing unit 250 may be implemented in or across one or more RAN components, such as a Node B/base transceiver station (BTS), radio network controller (RNC)/base station controller (BSC), and/or access gateway (AG). Thus, processing unit 250 may be implemented in the same device as either processing units 203 or 204, or it may be implemented in a device separate from and/or remotely located from processing units 203 or 204.

Figure 3:
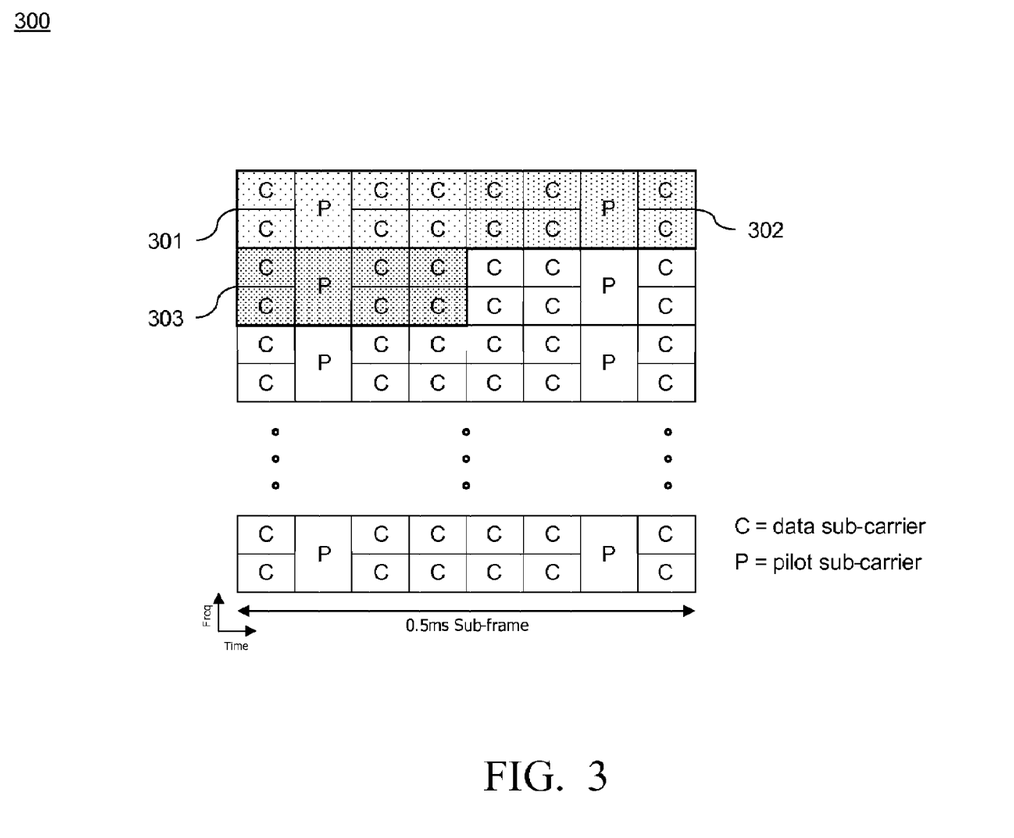
FIG. 3 is a block diagram depiction of a wireless resource region map (time verses frequency) showing an example of regions allocated for feedback signaling in accordance with multiple embodiments of the present invention.

Operation of embodiments in accordance with the present invention occurs substantially as follows. FIG. 1 depicts a first group of embodiments of the present invention. Processing unit 103 of device 101 transmits, via transceiver 105, an indication of a wireless resource that is to be used by remote units 120-122 for providing feedback corresponding to one or more broadcast/multicast service transmissions. FIG. 3 is a block diagram depiction of a wireless resource region map (time verses frequency) showing an example of regions allocated for feedback signaling. The FIG. 3 depiction is particular to embodiments having a 0.5 millisecond sub-frame with the data/pilot structure shown; however, many different framing and data/pilot structures are possible and are also compatible with embodiments of the present invention. Thus, wireless resource region map 300 is just one example provided for the purpose of illustrating embodiments of the present invention.

Processing unit 104 receives, via transceiver 106, the indication of the wireless resource that is to be used by remote units 120-122 for providing the feedback. The wireless resource indicated may be a time-frequency region such as region 301. Although region map 300 may represent either uplink or downlink resources (i.e., communication in either direction), the regions of map 300 will be assumed to be uplink regions for the purpose of this example. Also, region map 300 only depicts a single sub-frame; however, the indication of region 301 may be part of an indication of a series of periodically reoccurring wireless resources to be used for providing feedback and, of which, region 301 is but one resource.

In some embodiments, the indication of which wireless resources to use for feedback may be transmitted during the setup of a broadcast/multicast service session. In fact, an indication of a series of reoccurring wireless resources may be transmitted, but whether a remote unit is to use a resource, to begin using the resources or to stop using the resources for feedback may be separately indicated. For example, processing unit 103 may transmit, via transceiver 105, an indication of a series of periodically reoccurring wireless resources for providing feedback during the setup of a broadcast/multicast service session, and then using a control channel for the session dynamically indicate, during the session, which remote units should actually provide feedback using the indicated resources and when.

In another embodiment, processing unit 103 may transmit, via transceiver 105, a feedback probability factor for use by remote units in determining whether to transmit feedback information. In this way, network equipment 101 may adjust the number of remote units that provide feedback at any given time. For example, if a probability factor equivalent to say 50% is indicated, then each remote unit 120-122 would randomly determine, with a 50% chance of success, whether to transmit feedback corresponding to a given broadcast/multicast service transmission. During the broadcast/multicast service session, then, network equipment 101 could use a control channel for the session to dynamically adjust the probability factor used by the remote units. Alternatively, network equipment 101 could simply indicate during setup a probability factor to be used by the remote units for the entire session.

After setting up the broadcast/multicast service session, processing unit 103 begins to transmit, via transceiver 105, broadcast/multicast service transmissions. The service transmissions may be in the form of packets, such as multimedia packets for MBMS. When processing unit 104 receives, via transceiver 106, one of these transmissions, it determines whether it should provide feedback for this transmission. Assuming it determines that it should and that region 301 is the wireless resource it is to use at this time, processing unit 104 transmits, via transceiver 106, feedback information corresponding to the received transmission via region 301.

Examples of the type of feedback information that remote unit 120 may transmit include an acknowledgment (ACK) (indicating that a received transmission was successfully decoded), a negative acknowledgment (NACK) (indicating that a received transmission was not successfully decoded), and/or a quality-of-service (QoS) indicator. An example of a QoS indicator that may be sent is some indication of whether a symbol frame error rate (SFER) target was being met or not.

In some embodiments, processing unit 103 transmits, via transceiver 105, an indication of what type or types of feedback information remote units 120-122 should provide. For example, it might indicate whether they should provide only NACKs, ACKs and NACKs, only a QoS indicator, or some combination thereof. Such an indication may be transmitted during the setup of a broadcast/multicast service session or dynamically updated during the session using a control channel for the session.

Remote units 120-122 are all to provide at least some of their feedback (if any) using region 301. They are to do so at the same time using one or more shared signaling sequences. In some embodiments, each of remote units 120-122 transmitting feedback will use one shared signaling sequence for each type of feedback. For example, if only NACK feedback is to be provided, then each of remote units 120-122 transmitting NACK feedback will transmit the same signaling sequence in region 301. In another example, if both ACK and NACK feedback are to be provided, then each of remote units 120-122 transmitting NACK feedback will transmit one signaling sequence in region 301 and each of remote units 120-122 transmitting ACK feedback will transmit a different signaling sequence in region 301. The different signaling sequences used will need to be distinguishably different at the receiver; thus, orthogonal sequences may be used to differentiate the different feedback information.

In other embodiments, each of remote units 120-122 transmitting feedback will use a different wireless resource for each type of feedback. For example, if only NACK feedback is to be provided, then each of remote units 120-122 transmitting NACK feedback will transmit the same signaling sequence in region 301. However, if both ACK and NACK feedback are to be provided, then each of remote units 120-122 transmitting NACK feedback will transmit a shared signaling sequence in region 301 and each of remote units 120-122 transmitting ACK feedback will transmit a shared signaling sequence in region 302 (for example). In this case, the shared signaling sequences used for ACKs and for NACKs may either be the same or may be different.

When one considers that there may be multiple broadcast/multicast service sessions in progress, each requiring different types of feedback, it becomes apparent that there are many possible ways to arrange for feedback to be provided. Just some of the possible examples follow. Each individual session may use a single wireless resource for feedback, with each different type of feedback conveyed using a different shared sequence. Thus, regions 301-303 may each be used by different sessions. Or, each different type of feedback from each ongoing session may use a different wireless resource. Or, all feedback types for all sessions would use a single wireless resource, but each feedback type for each individual session would be conveyed using a different shared sequence.

Figure 4:
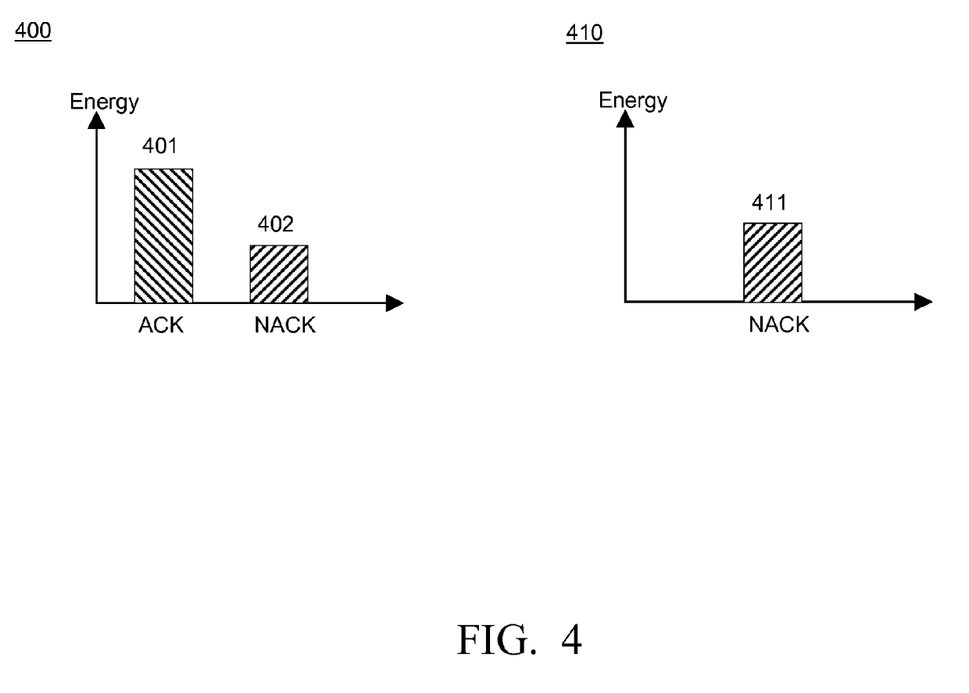
FIG. 4 depicts two bar charts showing, as examples, received energy levels of feedback signaling in accordance with multiple embodiments of the present invention.

FIG. 4 depicts two bar charts showing, as examples, received energy levels of feedback signaling in accordance with multiple embodiments of the present invention. Since remote units transmit at least one shared signaling sequence in the wireless resource at the same time, the transmissions naturally combine. When they are received by network equipment 101 (i.e., processing unit 103 via transceiver 105), network equipment 101 may utilize either a received energy level of the feedback information, a ratio of received energy levels of different feedback information (e.g., a ratio of an ACK energy level to a NACK energy level) or possibly a counting of the number of individual feedback transmissions. Charts 400 and 410 depict example received energy levels for the different types of feedback received. In the case of chart 400, received energy levels for ACKs 401 and NACKs 402 are depicted. In the case of chart 410, only a received energy level for NACKs 411 is depicted.

Processing unit 103 may use the feedback information received to make adjustments to the ongoing broadcast/multicast service session. For example, based on the received energy level of NACKs or the ratio of ACKs to NACKs, processing unit 103 may adjust a transmission data rate or a transmit power used for the broadcast/multicast service session. Based on the feedback information received, processing unit 103 may also determine whether or not to retransmit the broadcast/multicast service transmission for which the feedback was received. Having feedback information from at least some of the remote units involved in a broadcast/multicast service session made available to the network equipment enables the network equipment to dynamically manage the session and potentially improve the performance of the session. Moreover, utilizing shared wireless resources and/or shared signaling sequences reduces the overhead cost of obtaining feedback from remote units as compared to utilizing dedicated resources.

FIG. 2 depicts a second group of embodiments of the present invention. In situations in which multiple sites and/or transceivers are involved in a broadcast/multicast service session, feedback-related information may need to be conveyed within the network equipment from the multiple sites/transceivers to a device that functions as a broadcast/multicast service controller. In system 200, processing unit 250 performs this function. Processing units 203 and 204 receive feedback information from remote units 120-122 and remote units 221-222, respectively, in manner like that described above with respect to processing unit 103. Processing units 203 and 204 then convey to processing unit 250 either the feedback information they receive or information based on the feedback information they receive.

Processing unit 250 may then use the information from the processing units 203 and 204 to make adjustments to the ongoing broadcast/multicast service session. For example, processing unit 250 may adjust a transmission data rate or a transmit power used for the broadcast/multicast service session. Processing unit 250 may also determine whether or not to retransmit the broadcast/multicast service transmission to which the feedback corresponds. In some embodiments, processing units 203 and 204, either in addition to processing unit 250 or instead of unit 250, may adjust a transmit power used for the broadcast/multicast service session (at their site, e.g.) or may determine whether or not to retransmit (at their site and perhaps using additional wireless resources, e.g.) the broadcast/multicast service transmission to which the feedback corresponds. Thus, processing units 203 and 204 may make some decisions independent of each other and processing unit 250 regarding the transmission of the session at their particular sites.

A contribution related to the subject matter of the present description is planned for submission to the 3GPP standards body. A portion of the text planned for submission is included below to disclose additional embodiments and to further illustrate some of the embodiments described herein:

1. Introduction

The use of Single Frequency Network (SFN) is enabled by an OFDM system, thus providing high cell edge coverage for E-MBMS with Spectral Efficiency greater than one. The performance of E-MBMS can be further enhanced by using feedback techniques which is introduced in this contribution. The improvement could be substantial especially in macro-cellular and hot-spot (with limited multi-site macro-diversity) deployment.

2. E-MBMS with feedback

In [2], a polling mechanism was introduced to determine the appropriate modulation and coding state prior to start of service. Subsequent to this determination, however, adjustments may be needed during E-MBMS service duration due to user mobility and varying propagation conditions . . . . [A] common uplink feedback channel for sending E-MBMS feedback during service transmission (for the same E-MBMS service) is introduced for UE's in RRC_CONNECTED mode. For UE's in RRC_IDLE mode, it may be possible to provide feedback using non-synchronized random access, although whether non-synchronized random access can support the additional load requires further investigation. This common channel is used by the UE's to simultaneously transmit one-bit feedback information such Ack/Nack, QoS indicator, etc . . . .

For example, E-MBMS users may transmit Nack's using a common signature and time frequency region dedicated for Nack transmission in the uplink. Each common region may be used to provide feedback for a single E-MBMS service . . . with multiple regions defined in the system. The feedbacks from multiple UE's are naturally combined at the Node-B receiver because of the inherent nature of the DFT-SOFDM uplink. Note that the use of a common feedback region can also be applied to MCS determination at session start or for counting as proposed in [2]. To ensure an accurate determination of the number of responses, power control should be applied to the feedback so that each is received by the Node B at approximately the same power. In addition, to limit the amount of interference generated, UE's may elect to provide feedback based on a predefined feedback probability distribution [2].

Subsequent to receiving feedback, appropriate service adjustments can then be made in response to the provided feedback. For instance, based on the relative energy of Nack's, the Node-B can do the following:

a. Adapts the E-MBMS data rate so as to optimize throughput and coverage.

b. Determines whether to re-transmit or terminate the E-MBMS transmission based on the acknowledgment history.

c. Link adaptation to support flexible coverage areas

Further, multiple feedback regions . . . are required in the RL if multiple E-MBMS services are to be supported. In addition, these regions occur periodically. However, since a common time-frequency region is used for feedback, uplink overhead remains constant regardless of the number feedbacks per region.

3. Conclusion

In this contribution, the concept of E-MBMS with feedback was discussed.

4. References

[1] 3 GPP TR 25.814 V7.0.0, "Physical layer aspects for evolved Universal Terrestrial Radio Access (UTRA)," June 2006.

[2] R2-061985, "MBMS Modulation and Coding State Selection," Motorola, RAN2 LTE Ad Hoc, Cannes, France, June 2006.

[3] R1-060009, "E-UTRA Downlink Control Channel Design and Performance and TP," Motorola, RAN1 LTE Ad Hoc, Helsinki, Finland, January 2006.

One of skill in the art will appreciate that various modifications and changes may be made to the specific embodiments described above without departing from the spirit and scope of the present invention. Thus, the contribution text above is to be regarded as illustrative and exemplary rather than restrictive or all-encompassing, and all such modifications to the specific embodiments described above are intended to be included within the scope of the present invention.

Figure 5:
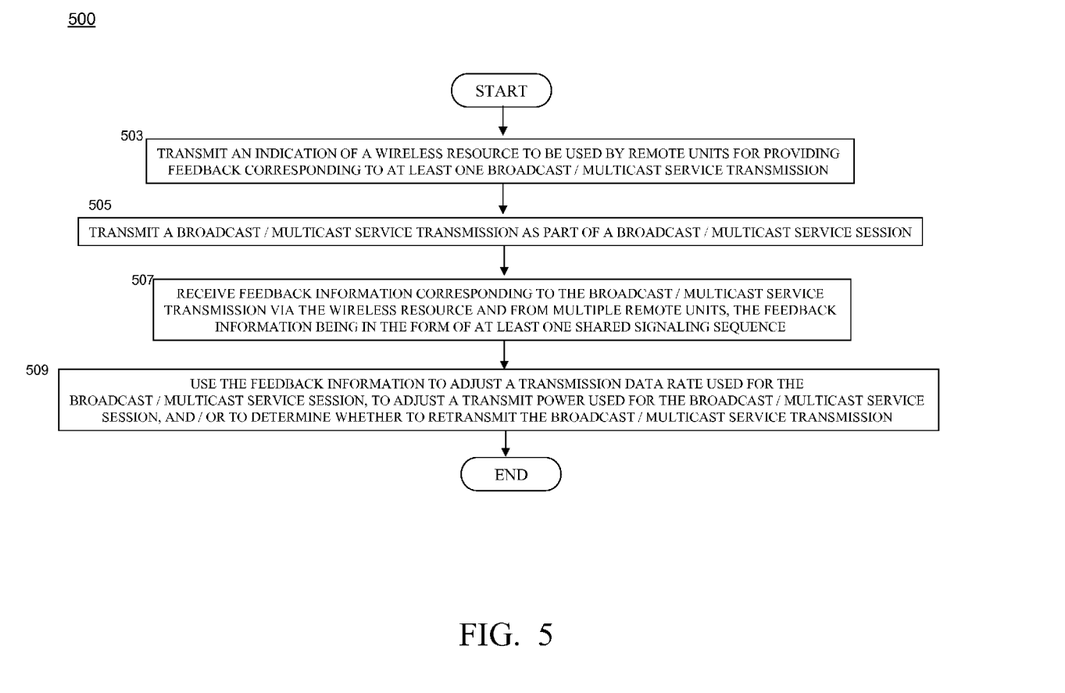
FIG. 5 is a logic flow diagram of functionality performed by network equipment in accordance with multiple embodiments of the present invention.

FIG. 5 is a logic flow diagram of functionality performed by network equipment (NE) in accordance with multiple embodiments of the present invention. Logic flow 500 begins when the NE transmits (503) an indication of a wireless resource that is to be used by remote units for providing feedback corresponding to at least one broadcast/multicast service transmission. The NE also transmits (perhaps subsequently) (505) a broadcast/multicast service transmission as part of a broadcast/multicast service session. In response, the NE receives (507) feedback information corresponding to the broadcast/multicast service transmission via the wireless resource and from at least some of the remote units, the feedback information being in the form of at least one shared signaling sequence. In most but not all embodiments, the NE may then utilize (509) the feedback information to adjust a transmission data rate used for the broadcast/multicast service session, to adjust a transmit power used for the broadcast/multicast service session, and/or to determine whether to retransmit the broadcast/multicast service transmission. Logic flow 500 then ends; however, in most embodiments many broadcast/multicast service transmission and feedback cycles would occur during the session.

Figure 6:
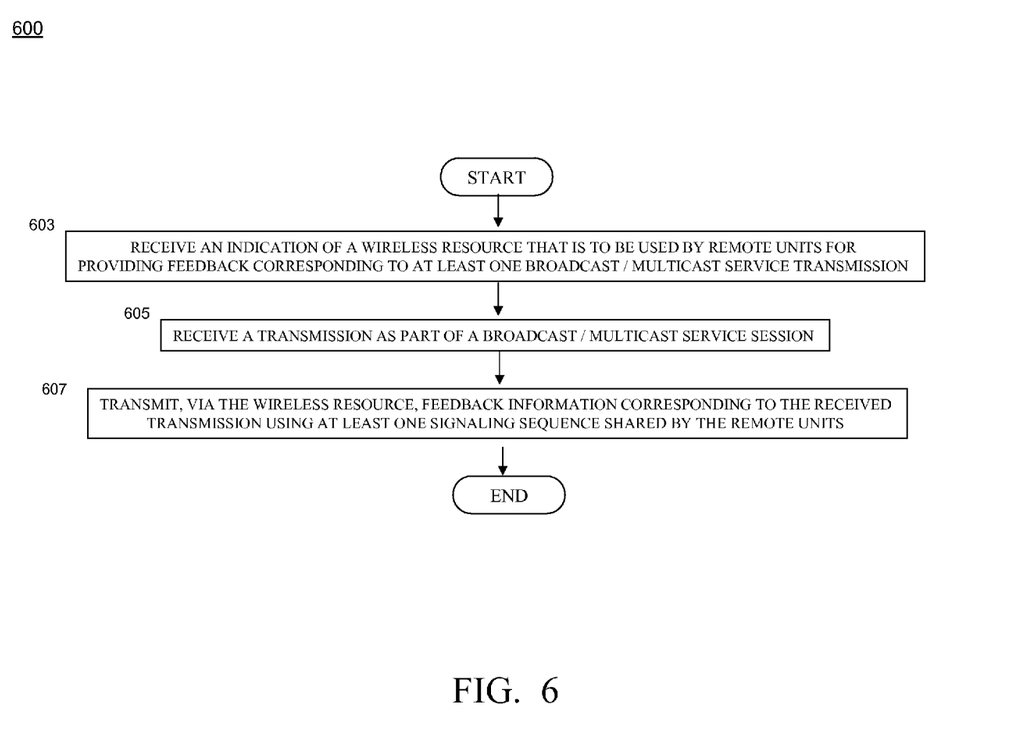
FIG. 6 is a logic flow diagram of functionality performed by a remote unit in accordance with multiple embodiments of the present invention.

FIG. 6 is a logic flow diagram of functionality performed by a remote unit in accordance with multiple embodiments of the present invention. Logic flow 600 begins when the remote unit receives (603) an indication of a wireless resource that is to be used by remote units for providing feedback corresponding to at least one broadcast/multicast service transmission. The remote unit also receives (perhaps subsequently) (605) a transmission as part of a broadcast/multicast service session. In response, the remote unit transmits (607), via the wireless resource, feedback information corresponding to the received transmission using at least one signaling sequence shared by the plurality of remote units. Logic flow 600 then ends; however, in most embodiments many broadcast/multicast service transmission and feedback cycles would occur during the session.

Benefits, other advantages, and solutions to problems have been described above with regard to specific embodiments of the present invention. However, the benefits, advantages, solutions to problems, and any element(s) that may cause or result in such benefits, advantages, or solutions, or cause such benefits, advantages, or solutions to become more pronounced are not to be construed as a critical, required, or essential feature or element of any or all the claims.

As used herein and in the appended claims, the term "comprises," "comprising," or any other variation thereof is intended to refer to a non-exclusive inclusion, such that a process, method, article of manufacture, or apparatus that comprises a list of elements does not include only those elements in the list, but may include other elements not expressly listed or inherent to such process, method, article of manufacture, or apparatus. The terms a or an, as used herein, are defined as one or more than one. The term plurality, as used herein, is defined as two or more than two. The term another, as used herein, is defined as at least a second or more. The terms including and/or having, as used herein, are defined as comprising (i.e., open language). The term coupled, as used herein, is defined as connected, although not necessarily directly, and not necessarily mechanically. Terminology derived from the word "indicating" (e.g., "indicates" and "indication") are intended to encompass all the various techniques available for communicating or referencing the object being indicated. Some, but not all examples of techniques available for communicating or referencing the object being indicated include the conveyance of the object being indicated, the conveyance of an identifier of the object being indicated, the conveyance of information used to generate the object being indicated, the conveyance of some part or portion of the object being indicated, the conveyance of some derivation of the object being indicated, and the conveyance of some symbol representing the object being indicated. The terms program, computer program, and computer instructions, as used herein, are defined as a sequence of instructions designed for execution on a computer system. This sequence of instructions may include, but is not limited to, a subroutine, a function, a procedure, an object method, an object implementation, an executable application, an applet, a servlet, a shared library/dynamic load library, a source code, an object code and/or an assembly code.

What is claimed is:

1. A method for obtaining feedback for a broadcast/multicast service comprising:
    transmitting an indication of a wireless resource that is to be used by a plurality of remote units for providing feedback corresponding to at least one broadcast/multicast service transmission;
    transmitting a broadcast/multicast service transmission as part of a broadcast/multicast service session;
    receiving feedback information corresponding to the broadcast/multicast service transmission via the wireless resource and from at least some of the plurality of remote units, the feedback information being in the form of at least one simultaneously transmitted shared signaling sequence.

2. The method of claim 1, wherein the feedback information comprises at least one of an acknowledgment (ACK), a negative acknowledgment (NACK), and a quality-of-service (QoS) indicator.

3. The method of claim 1, wherein the at least one shared signaling sequence comprises
    a first shared sequence to be used by each of the plurality of remote units transmitting feedback information of a first type via the wireless resource and
    an additional shared sequence to be used by each of the plurality of remote units transmitting feedback information of a different type via the wireless resource.

4. The method of claim 1, wherein the wireless resource comprises an uplink time-frequency region.

5. The method of claim 1, wherein transmitting the indication of the wireless resource that is to be used by the plurality of remote units for providing feedback comprises
    transmitting an indication of a series of periodically reoccurring wireless resources to be used for providing feedback, wherein the series of periodically reoccurring wireless resources comprises the wireless resource.

6. The method of claim 1, further comprising
    transmitting a feedback probability factor for use by remote units in determining whether to transmit feedback information corresponding to the broadcast/multicast service transmission via the wireless resource.

7. The method of claim 1, further comprising
    utilizing the feedback information to perform at least one of
        adjusting a transmission data rate used for the broadcast/multicast service session,
        adjusting a transmit power used for the broadcast/multicast service session, and
        determining whether to retransmit the broadcast/multicast service transmission.

8. The method of claim 7, wherein utilizing the feedback information comprises utilizing at least one of a received energy level of the feedback information and a counting of the number of feedback responses providing the feedback information.

9. The method of claim 8, wherein utilizing a received energy level of the feedback information comprises
    utilizing a ratio of the received energy level of the feedback information to a received energy level of additional feedback information also corresponding to the broadcast/multicast service transmission,
    wherein one of the feedback information and the additional feedback information comprises an acknowledgment (ACK) and the other of the feedback information and the additional feedback information comprises a negative acknowledgment (NACK).

10. A method for providing feedback for a broadcast/multicast service comprising:
    receiving an indication of a wireless resource that is to be used by a plurality of remote units for providing feedback corresponding to at least one broadcast/multicast service transmission;
    receiving a transmission as part of a broadcast/multicast service session;
    transmitting, via the wireless resource, feedback information corresponding to the received transmission using at least one simultaneously transmitted, signaling sequence shared by the plurality of remote units.

11. The method of claim 10, wherein the feedback information comprises at least one of an acknowledgment (ACK), a negative acknowledgment (NACK), and a quality-of-service (QoS) indicator.

12. The method of claim 10, wherein transmitting, via the wireless resource, the feedback information corresponding to the received transmission comprises
    transmitting, via the wireless resource, a NACK when the received transmission is not successfully decoded.

13. The method of claim 10, wherein transmitting, via the wireless resource, the feedback information corresponding to the received transmission comprises     determining to transmit the feedback information using a feedback probability factor.

14. Network equipment comprising:

a transceiver;

a processing unit, communicatively coupled to the transceiver, adapted to transmit, via the transceiver, an indication of a wireless resource that is to be used by a plurality of remote units for providing feedback corresponding to at least one broadcast/multicast service transmission,     adapted to transmit, via the transceiver, a broadcast/multicast service transmission as part of a broadcast/multicast service session, and     adapted to receive, via the transceiver, feedback information corresponding to the broadcast/multicast service transmission via the wireless resource and from at least some of the plurality of remote units, the feedback information being in the form of at least one simultaneously transmitted, shared signaling sequence.

15. The network equipment of claim 14, wherein the processing unit is further adapted to utilize the feedback information to perform at least one of     adjusting a transmission data rate used for the broadcast/multicast service session,     adjusting a transmit power used for the broadcast/multicast service session, and     determining whether to retransmit the broadcast/multicast service transmission.

16. The network equipment of claim 14, further comprising a second processing unit, communicatively coupled to the processing unit, adapted to utilize information received from the processing unit that is based on the feedback information to perform at least one of     adjusting a transmission data rate used for the broadcast/multicast service session,     adjusting a transmit power used for the broadcast/multicast service session, and     determining whether to retransmit the broadcast/multicast service transmission.

17. The method of claim 16, wherein the second processing unit being adapted to utilize information received from the processing unit that is based on the feedback information comprises the second processing unit being further adapted to utilize information based on additional feedback information received by at least one additional transceiver.

18. A remote unit comprising:

a transceiver;

a processing unit, communicatively coupled to the transceiver, adapted to receive, via the transceiver, an indication of a wireless resource that is to be used by a plurality of remote units for providing feedback corresponding to at least one broadcast/multicast service transmission,     adapted to receive, via the transceiver, a transmission as part of a broadcast/multicast service session, and     adapted to transmit, via the transceiver and via the wireless resource, feedback information corresponding to the received transmission at least one simultaneously transmitted, signaling sequence shared by the plurality of remote units.

\* \* \* \* \*